(12) United States Patent
Lawler et al.

(10) Patent No.: US 9,594,771 B2
(45) Date of Patent: Mar. 14, 2017

(54) SYSTEM FOR ANALYSIS AND GEOSPATIAL VISUALIZATION

(71) Applicant: Courage Services, Inc., Arlington, VA (US)

(72) Inventors: Michael Jon Lawler, Haymarket, VA (US); Mark Gregory Polyak, Fairfax, VA (US); Kevin Anthony Stofan, Saint Petersburg, FL (US); Ross Ethan Novell, Blacksburg, VA (US); Thomas J Flint, Alexandria, VA (US)

( * ) Notice: Subject to any disclaimer, the term of this patent is extended or adjusted under 35 U.S.C. 154(b) by 522 days.

(21) Appl. No.: 14/157,082

(22) Filed: Jan. 16, 2014

(65) Prior Publication Data

US 2015/0199381 A1    Jul. 16, 2015

(51) Int. Cl.
G06F 17/30    (2006.01)

(52) U.S. Cl.
CPC ............... *G06F 17/30241* (2013.01)

(58) Field of Classification Search
None
See application file for complete search history.

(56) References Cited

U.S. PATENT DOCUMENTS

| | | | |
|---|---|---|---|
| 6,999,876 B2 * | 2/2006 | Lambert | A62B 99/00 702/2 |
| 7,529,195 B2 | 5/2009 | Gorman | |
| 8,392,354 B2 | 3/2013 | Salemann | |
| 8,422,399 B2 | 4/2013 | Gorman | |
| 8,620,686 B1 * | 12/2013 | Reinecke | G06Q 10/06 705/2 |
| 8,799,799 B1 * | 8/2014 | Cervelli | G06F 3/0481 707/723 |
| 2005/0278362 A1 | 12/2005 | Maren et al. | |
| 2007/0218900 A1 | 9/2007 | Abhyanker | |
| 2008/0294678 A1 | 11/2008 | Gorman et al. | |
| 2010/0083124 A1 | 4/2010 | Druzgalski et al. | |
| 2011/0199376 A1 | 8/2011 | Salemann | |
| 2011/0202326 A1 | 8/2011 | Salemann | |
| 2011/0231416 A1 | 9/2011 | Goodchild Drake | |
| 2013/0325787 A1 * | 12/2013 | Gerken | G06N 7/005 706/52 |
| 2014/0081619 A1 * | 3/2014 | Solntseva | G06F 17/289 704/3 |

(Continued)

*Primary Examiner* — Debbie Le
(74) *Attorney, Agent, or Firm* — Welsh Flaxman & Gitler LLC

(57) ABSTRACT

A system for analysis and geospatial visualization includes a database of human geography data, a social media data engine, a network of information concerning disaster relief and humanitarian assistance, and a database of research, software code and academic publications. The system also includes an analysis engine using the data generated by the database of human geography data, the social media data engine, the network of information concerning disaster relief and humanitarian assistance and the database of research, software code and academic publications to identify information. A graphical user interface displays the information identified by the analysis engine, the graphical user interface providing a mapping centric focus applying the information identified by the analysis engine within the context of a geospatial environment.

9 Claims, 21 Drawing Sheets

(56) References Cited

U.S. PATENT DOCUMENTS

2014/0280341 A1* 9/2014 Rafei ................ G06F 17/30386
707/776
2015/0142846 A1* 5/2015 Levine .............. G06F 17/30575
707/769

* cited by examiner

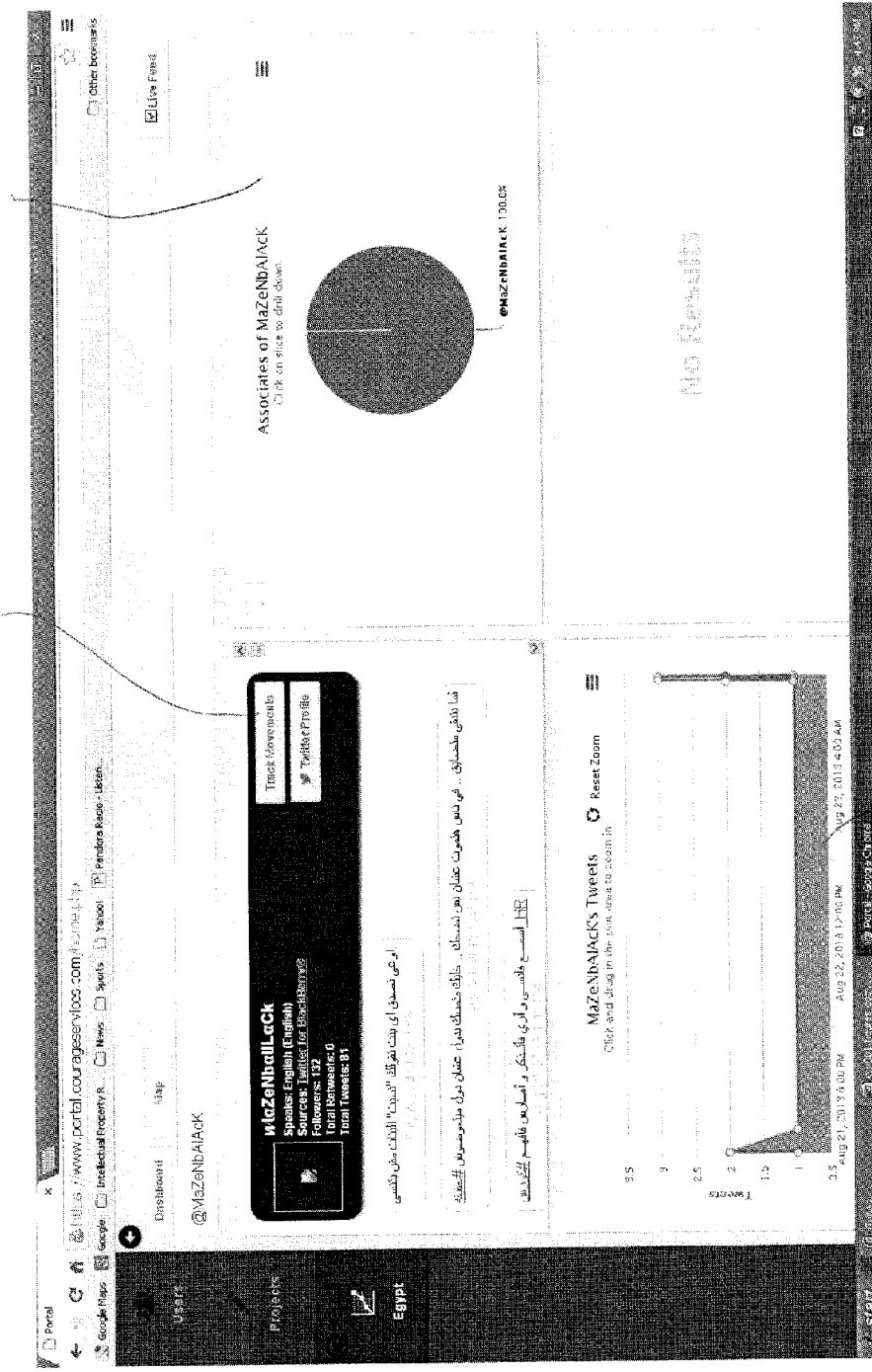

SYSTEM FOR ANALYSIS AND GEOSPATIAL VISUALIZATION

BACKGROUND OF THE INVENTION

1. Field of the Invention

The present application is directed to a system for analysis and geospatial visualization.

2. Description of the Related Art

A wealth of knowledge is available throughout the electronic world. However, the problem now confronting both government and industry is how to most effectively take advantage of the ever accumulating information that is readily available.

The present invention attempts to address this problem through the provision of a system analyzing both dynamic and static information, and presenting the information in a geospatial data display and visualization that enables real time event discovery and recognition of societal mood and trends.

SUMMARY OF THE INVENTION

The present invention provides for analysis and geospatial visualization with socio-cultural observation and reporting portal for intelligence and operations networks. The present system combines human geography data on over 140 countries of the world with real time geo-enabled social media feeds, as well as with local insight of an informal network of NGOs (Non-Governmental Organizations), local polling and academia providers and socio-cultural SMEs (Small and Medium Sized Enterprises), with roughly 45,000 correspondents in the network. The present system enables real-time event discovery, recognition of a societal mood within a specific place, languages spoken and geography, anticipatory warning of strategic trends, and/or early warning of potential societal "trigger" events. The specialized data developed and made available through the present system fills gaps that organizations and contractors of the intelligence community have been unable to close using traditional intelligence research and analysis methods.

With this in mind, it is an object of the present invention invention to provide a system for analysis and geospatial visualization. The system includes a database of human geography data, a social media data engine, a network of information concerning disaster relief and humanitarian assistance and a database of research, software code and academic publications. The system also includes an analysis engine using data generated by the database of human geography data, the social media data engine, the network of information concerning disaster relief and humanitarian assistance and the database of research, software code and academic publications to identify information. Finally, the system includes a graphical user interface displaying the information identified by the analysis engine, the graphical user interface providing a mapping centric focus applying the information identified by the analysis engine within the context of a geospatial environment.

It is also an object of the present invention to provide a system wherein the database of human geography data includes human geography data on countries of the world including colonial archives, NGO reports, related academic publications, web-based sources and other sources of geospatial data.

It is another object of the present invention to provide a system wherein the social media data engine includes data from international and local social media engines.

It is a further object of the present invention to provide a system wherein the data includes data gathered from streaming APIs.

It is also an object of the present invention to provide a system wherein the data includes data gathered from static APIs.

It is another object of the present invention to provide a system wherein the network of information concerning disaster relief and humanitarian assistance is a passive access and information platform sharing information collected with organizations involved in disaster relief and humanitarian aid.

It is a further object of the present invention to provide a system wherein the database of research, software code and academic publications identifies and collates a relationship between individuals, research and organizations.

It is also an object of the present invention to provide a system wherein the analysis engine includes a plurality of tools allowing users to optimize the system.

It is another object of the present invention to provide a system wherein the tools allowing users to optimize the system are selected from the group consisting of a federated text search, a natural language processor, a geo-cluster detection algorithm, a wealth detection algorithm, a dominance estimation algorithm, an emerging trend detection algorithm, a partner analysis module and combinations thereof.

It is a further object of the present invention to provide a system wherein the analysis engine ingests real-time space-time points events and several sub-processes to detect and identify statistically significant spatio-temporal clusters.

It is also an object of the present invention to provide a system wherein the analysis engine ingests social media event data containing geographic and temporal attributes.

It is another object of the present invention to provide a system wherein the analysis engine plots ingested space-time points in four dimensions, establishing an observed space-time study area.

It is a further object of the present invention to provide a system wherein the observed space-time study area is used to conduct simulations which create theoretical random experiments to test a significance of an observed space-time pattern.

It is also an object of the present invention to provide a system wherein the analysis engine uses a greedy deletion algorithm to calculate a minimum spanning tree for n to 1 experimental values in each simulation in order to establish experimental confidence intervals used to test observed values.

It is another object of the present invention to provide a system wherein when the experimental confidence intervals are established, observed space-time point patterns are tested at each n value from n to 1 in order to test all potential cluster sizes within a temporal cross-section.

Other objects and advantages of the present invention will become apparent from the following detailed description when viewed in conjunction with the accompanying drawings, which set forth certain embodiments of the invention.

BRIEF DESCRIPTION OF THE DRAWINGS

FIGS. 2-21 are screenshots of a graphical user interface implemented in the use of the present system.

DETAILED DESCRIPTION OF THE INVENTION

Figure 1:
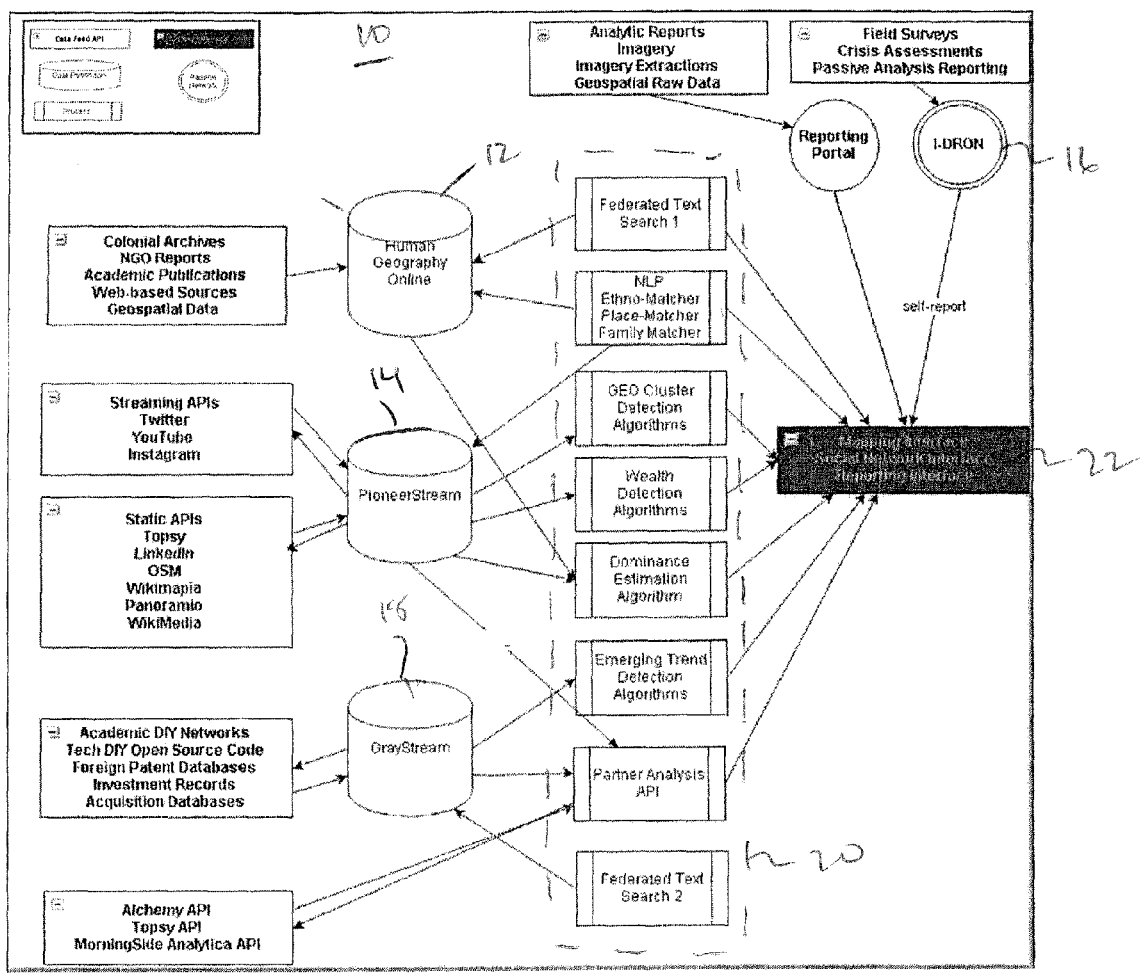
FIG. 1 is a schematic representation of the present system for analysis and geospatial visualization.

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as a basis for teaching one skilled in the art how to make and/or use the invention.

The present system 10 for analysis and geospatial visualization provides a socio-cultural observation and reporting portal for intelligence and operations networks. The present system 10 combines human geography data on over 140 countries of the world with real time geo-enabled social media feeds, as well as with local insight of an informal network of NGOs (Non-Governmental Organizations), local polling and academia providers and socio-cultural SMEs (Small and Medium Sized Enterprises), with roughly 45,000 correspondents in the network.

The present system 10 enables real-time event discovery, recognition of a societal mood within a specific place, languages spoken and geography, anticipatory warning of strategic trends, and/or early warning of potential societal "trigger" events. The specialized data developed and made available through the present system 10 fills gaps that organizations and contractors of the intelligence community have been unable to close using traditional intelligence research and analysis methods.

As will be fully appreciated based upon the following disclosure, the present system 10 includes powerful open and gray source harvesting of engines/algorithms that are capable of ingesting over 250,000 sources of socio-cultural and human geography data on a daily basis. In addition, the platform of the present system 10 is customized for tactical and strategic analysis of harvested real-time social media data for pattern of life, targeting and other intelligence purposes.

The present system 10 also provides federated search capability, namely information retrieval technology that allows the simultaneous search of multiple searchable resources, which enables seamless geospatial, textual and image-based data discovery and recovery. The system 10 further provides revolutionary predictive analytics for global social instability forecasting. Finally, the present system human geography library maintains a database including plug and play modules for 153 countries of the world.

As will be fully appreciated based upon the following disclosure, the present system 10 allows for the publishing, layering and uploading of client and other partner provided geospatial data in a user friendly environment. The system's features include dynamic display and download of geospatial data, support for .KML/.KMZ and .SHP files (Keyhole Markup Language, (.KML or .KMZ[zipped .KML files]), or .SHP, a shapefile, namely a popular geospatial vector data format for geographic information system software which is an XML notation for expressing geographic annotation and visualization within Internet-based, two-dimensional maps and three-dimensional Earth browsers.), dynamic upload capability, support for geo-rectified .XLS, .KML/.KMZ and .SHP files, multiple basemap and imagery base layer options, support for adding customized base layers, and "one-click" map export capability.

With the foregoing in mind, and with reference to the various figures, the present invention provides a system 10 for harvested data analysis and geospatial visualization. As shown in FIG. 1, the system 10 includes a database of human geography data 12, a social media data engine 14, a network of information concerning disaster relief and humanitarian assistance 16, and a research database of research, software code and academic publications 18. An analysis engine 20 harvests and uses the data generated by the database of human geography data 12, the social media data engine 14, the network of information concerning disaster relief and humanitarian assistance 16 and the research database of research, software code and academic publications 18 to identify information. The information identified by the analysis engine 20 is displayed upon a graphical user interface 22. The graphical user interface 22 provides a mapping centric focus applying the information identified by the analysis engine 20 within the context of a geospatial environment.

Considering first the various data sources, the database of human geography data 12 is composed of human geography data on 140 countries of the world. This data has been acquired, collected, catalogued and geo-enabled for the past 10 years. This geospatial human geography library incorporates data resources from 1800s until now. It incorporates data from British, French, Portuguese, Russian, Belgian and German colonial archives, incorporating over 200+ years of continuous observations of cultural officers, intelligence operatives and tribal advisers in areas from Afghanistan to Indonesia. The database of human geography data 12 also includes colonial archives, NGO reports, related academic publications, web-based sources and other sources of geospatial data. Furthermore, it includes current data on 13 NGA-recognized layers of human geography, including water, land ownership, significant events, health facilities, and other important dimensions of human activity. This fusion of historical and current data provides analysts the ability to seamlessly identify root causes of conflict, recognize reasons for leadership change and sources of power within a particular society, either in a highly urbanized or in a tribal setting.

The social media data engine 14 incorporates data from international and local social media engines, including streaming APIs (application programming interfaces) such as YouTube, LinkedIn, Twitter, Instagram, etc. and static APIs such as Topsy, LinkedIn, OSM, Wikimapia, Panaramio, WikiMedia, etc. Using such harvested information, the present system 10 allows for real-time situational awareness of geospatial and contextual trends anywhere in the world. In addition, analysts can use the social media data engine 14 to in real time identify infrastructure, places and events that are important to the locals. The social media data engine 14 is powered by a number of powerful algorithms that allow recognition whether a crowd is being formed or whether a particular infrastructure may get overwhelmed in the event of a major medical crisis such as a flu outbreak or pandemic.

The network of information concerning disaster relief and humanitarian assistance 16 is a passive access and information platform sharing with over 60 NGOs involved in disaster relief and humanitarian aid assistance in over 150 countries of the world totaling over 40,000 individuals. This network 16 provides unique and on the ground perspectives of routine and crisis perspectives of communities in need. As a matter of routine, they conduct baseline and need assessments of affected communities and maintain links to local formal and informal leadership within areas affected by disaster.

Finally, the database of research, software code and academic publications 18 identifies research, software code and academic publication in the open and gray domain (that is, written material that is informally published). For example, this database 18 obtains information Academic DIY Networks, Tech DIY Open Source Code, Patent Databases, Investment Records and Acquisition Databases. This component constantly scans academic and technical DIY research exchange and sharing networks (~4.3 million members) for new technical code, unique research and network participant information. It identifies and collates the relationship between individuals, research and organizations, identifying emerging technical and academic innovation leaders as well as unique perspectives that are potentially never going to be published.

As briefly discussed above, the analysis engine 20 uses the data generated by the database of human geography data 12, the social media data engine 14, the network of information concerning disaster relief and humanitarian assistance 16 and the database of research, software code and academic publications 18 to identify and harvest information. More particularly, the analysis engine 20 provides for a variety of tools allowing users to optimize the system 10 to suit their specific needs. Included amongst the tools are A federated text search An Natural Language Processsor (NLP) providing for ethno-matching, place-matching and family matching A geo-cluster detection algorithm A language detection algorithm A wealth detection algorithm A dominance estimation algorithm An emerging trend detection algorithm A partner analysis module obtaining information from partnering data sources, for example, GNIP API, and Morningside Analytica API.

These tools, which may collectively be referred to as the spatio-temporal cluster detection algorithm, ingests real-time space-time points (events) and uses several sub-processes outlined below to detect and identify statistically significant spatio-temporal clusters. In its current state, the spatio-temporal cluster detection algorithm ingests social media event data containing geographic and temporal attributes. While the spatio-temporal cluster detection algorithm is disclosed herein as ingesting social media event data containing geographic and temporal attributes, it is appreciated the spatio-temporal cluster detection algorithm has the ability to ingest any type of spatio-temporal point data. The current rate of space-time point ingestion is approximately 1000 points per minute using a standard desktop computer.

In order to detect spatio-temporal clusters, the spatio-temporal cluster detection algorithm plots ingested space-time points in four (4) dimensions, establishing an observed space-time study area. The observed space-time study area boundary is used to conduct thousands of Monte Carlo simulations which create theoretical random experiments used to test the significance of the observed space-time pattern. It is appreciated a Monte Carlo simulation refers to a class of computational algorithms relying upon repeated random sampling to obtain numerical results. A greedy deletion algorithm is used to calculate the minimum spanning tree for n to 1 experimental values in each simulation in order to establish experimental confidence intervals used to test observed values.

Once the experimental minimum spanning tree confidence intervals are established, the observed space-time point patterns are tested at each n value from n to 1 in order to test all potential cluster sizes within the temporal cross-section. Because the minimum spanning tree calculation uses all point values within the tree, the algorithm is able to detect irregularly shaped clusters in contrast to traditional cluster detection statistics which typically use concentric circles or quadrats to test for significance.

In addition to detecting spatio-temporal clusters using raw space-time event data, the spatio-temporal cluster detection algorithm also conducts population normalized spatio-temporal cluster detection using global population estimates at a 700 m by 700 m spatial resolution. Observed values are normalized and scaled using the estimated ambient population within the spatial grid cell area that the point lies in. The resulting space-time event pattern is then tested for statistical significance as detailed above. Similarly, detection is also conducted using historical observation normalization. This normalization process uses observed historical data collected and summarized at hourly intervals using the same spatial resolution as the population normalization above. The current observed space-time data is normalized and scaled using the spatial grid cell and hourly time area that the point lies in. The resulting space-time event pattern is also tested for spatial significance using the greedy deletion algorithm described above. Upon completion, the spatio-temporal cluster detection algorithm returns all significant clusters to the social media analysis engine which can then alert the user to the existence and location of cluster within 30 seconds of the occurrence of the events.

The spatio-temporal cluster detection algorithms employed in conjunction with these tools of the analysis engine 20 allow for the harvesting and analysis of historical and streaming data from social media sources, such as TWITTER, FOURSQUARE, YOUTUBE, INSTAGRAM, FACEBOOK and others. As such, the analysis engine 20 addresses five types of social media data types: 1) demographic 2) psychographic 3) behavioral 4) location 5) intention. On a monthly basis approximately 5 million disparate social interactions are harvested by the analysis engine 20 from individual users of these systems, including (as described in the third party provider (e.g. TWITTER) end user agreement) demographic (age, gender, inferred income, self-identified location); psychographic (values, attitudes, interests, lifestyles), behavioral (past activities/actions baseline that may indicate future intent, i.e. marching to a protest area, purchasing history) and location (physical location or geo-inferred location of an individual/groups of individuals).

This data as well as associated derived patterns (e.g. individual(s) aggregate favorite destinations, micro-paths, business venue preferences, content-based geographic areas of concentration) are stored in a database 100, in particular, a MongoDB, an open source cross-platform NoSQL document-oriented database system.

The analysis engine 20 focuses on three main types of patterns: 1) spatial patterns associated with users 2) content-driven patterns associated with activities and preferences and 3) language or linguistic patterns associated with the language spoken by the person initiating the tweeted message. Specifically, spatial algorithms of the analysis engine 20 automatically identify a) clustering of individuals at any urban area of the world based of geo-enabled twitter data, b) the language spoken by individuals, c) auto-identification of a particular area as a "popular spot" based of individuals' aggregated activity, and d) aggregate snapshots of individuals' potential movement pathways based on known/expected baseline activity. The content based analysis engine component focuses on identifying and geospatial displaying user intent/affinity for ideological action/group, i.e. hate speech, language spoken, and ideological affinity for a specific terrorist/political/religious group.

In practice, the present system 10 empowers a user to acquire, investigate and analyze large amounts of data from multiple sources in one web-based environment. To accomplish this, the present system implements and employs algorithms to query unique data repositories (databases) of both static and dynamic data and geo-spatially display the results of such queries.

Additionally, an editing function is available within the software that allows users to input, update and delete data. Users employ the editing functions within an attribute table to select and filter selected attribute rows and geospatially display selected information in the mapping view. Users can further export selected data as csv and/or ESRI shapefile data types. The editing function also allows users to create a new layer from selected data and publish it within their project as well as immediately share it with other authorized users. This interactive ability allows multiple worldwide users to share information in real time in the same environment.

The information identified by the analysis engine 20 is displayed upon a graphical user interface 22. The graphical user interface 22 provides a mapping centric focus applying the information identified by the analysis engine within the context of a geospatial environment.

Figure 2:
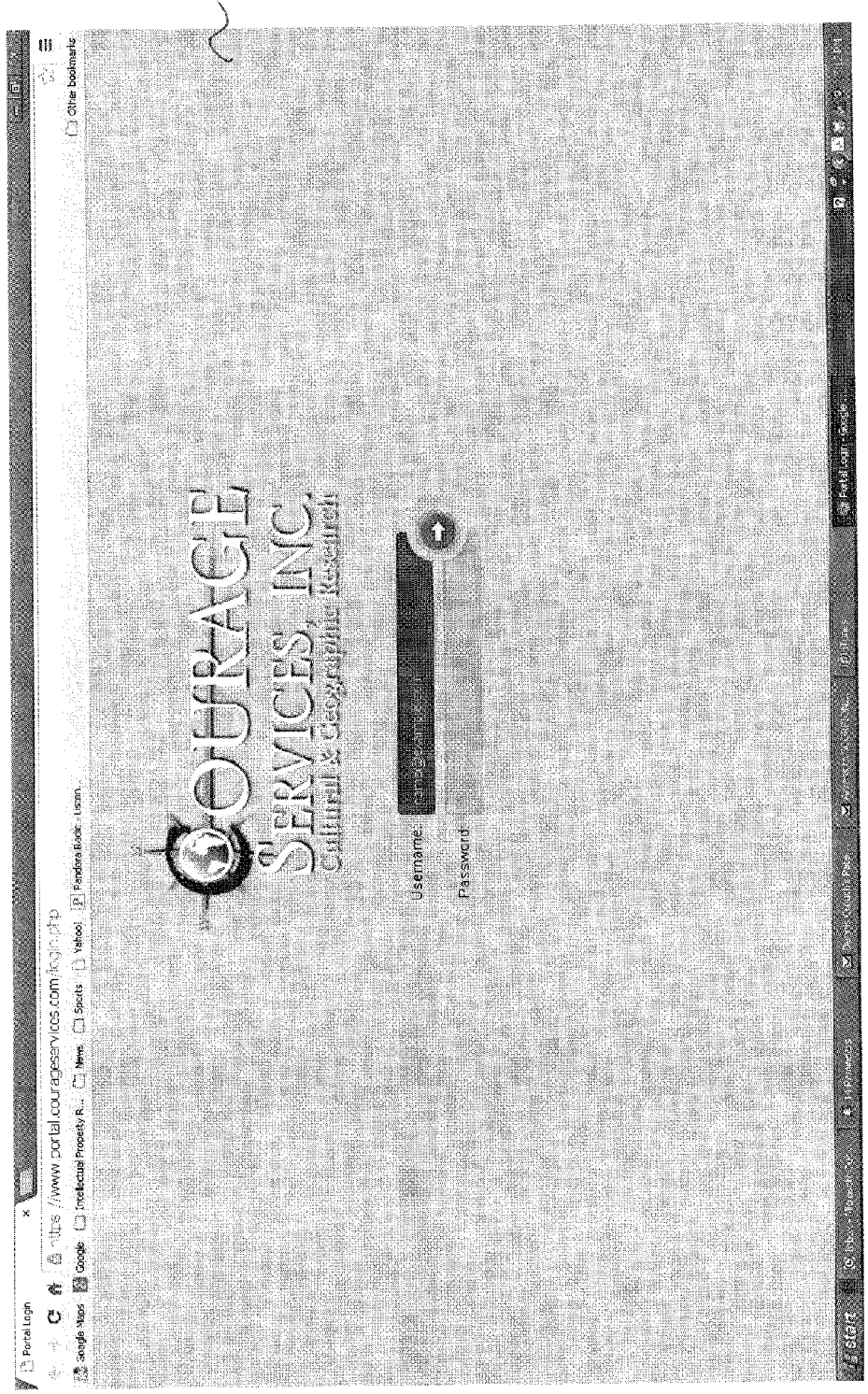
Figure 3:
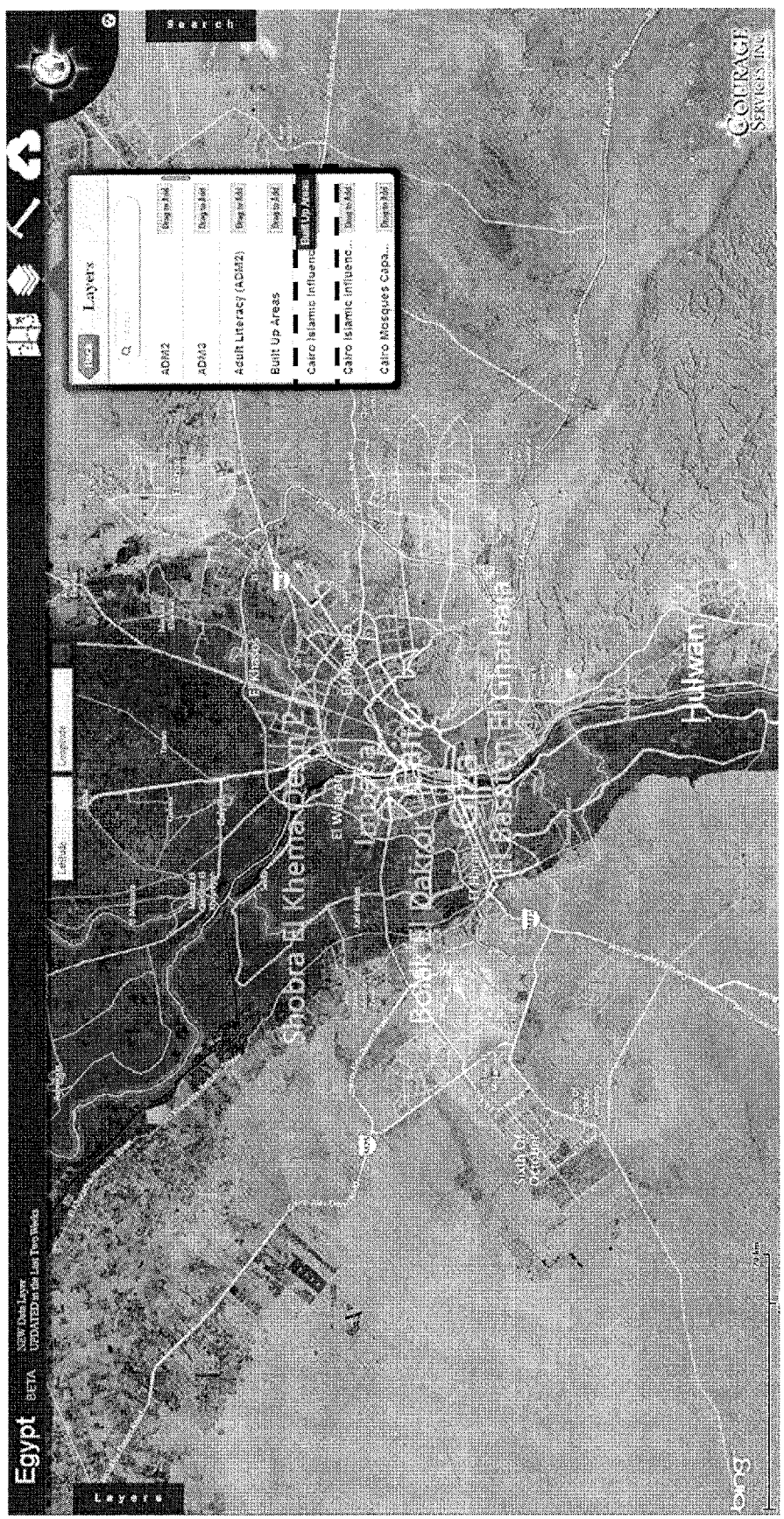
Figure 4:
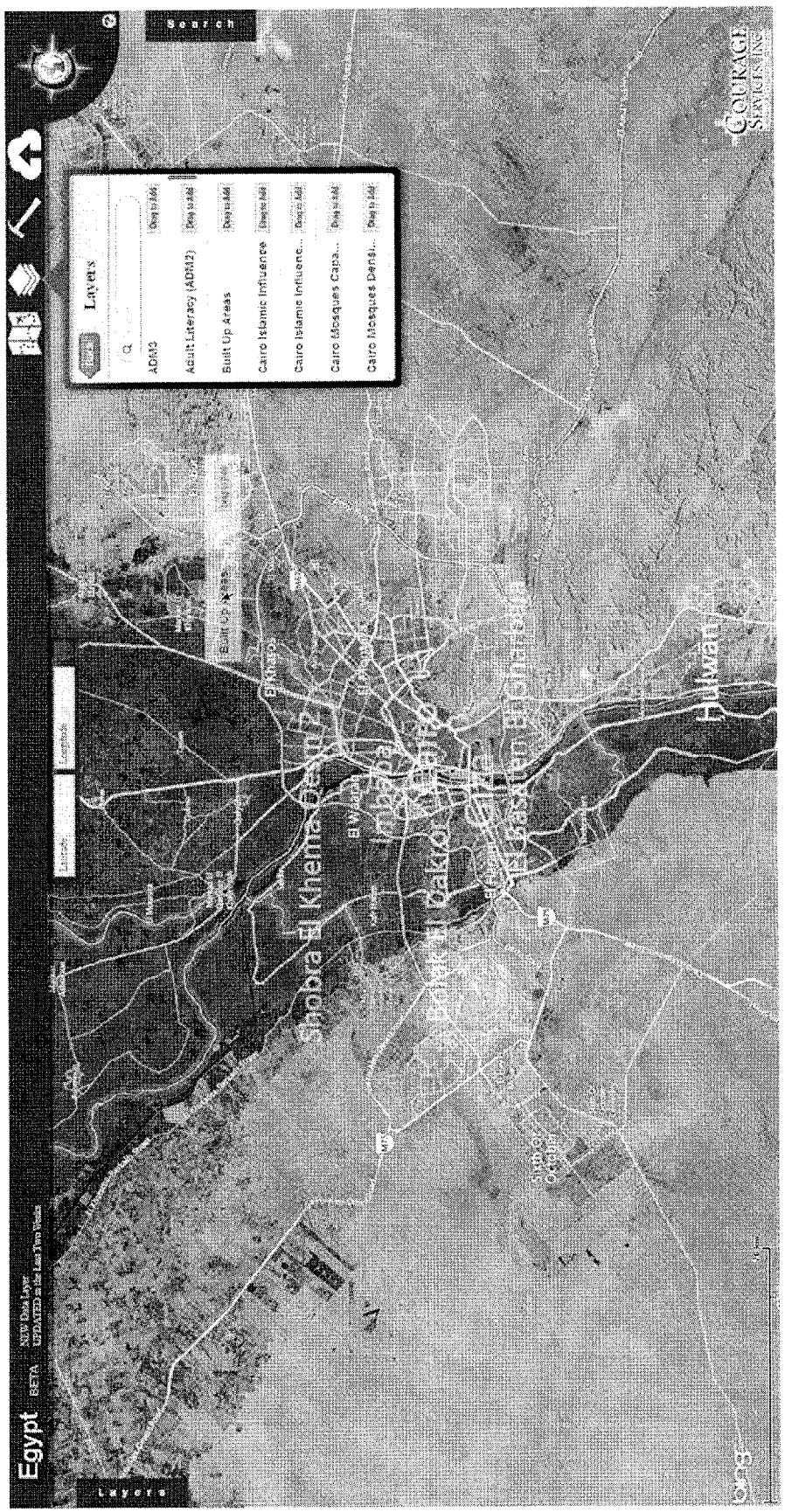
Figure 5:
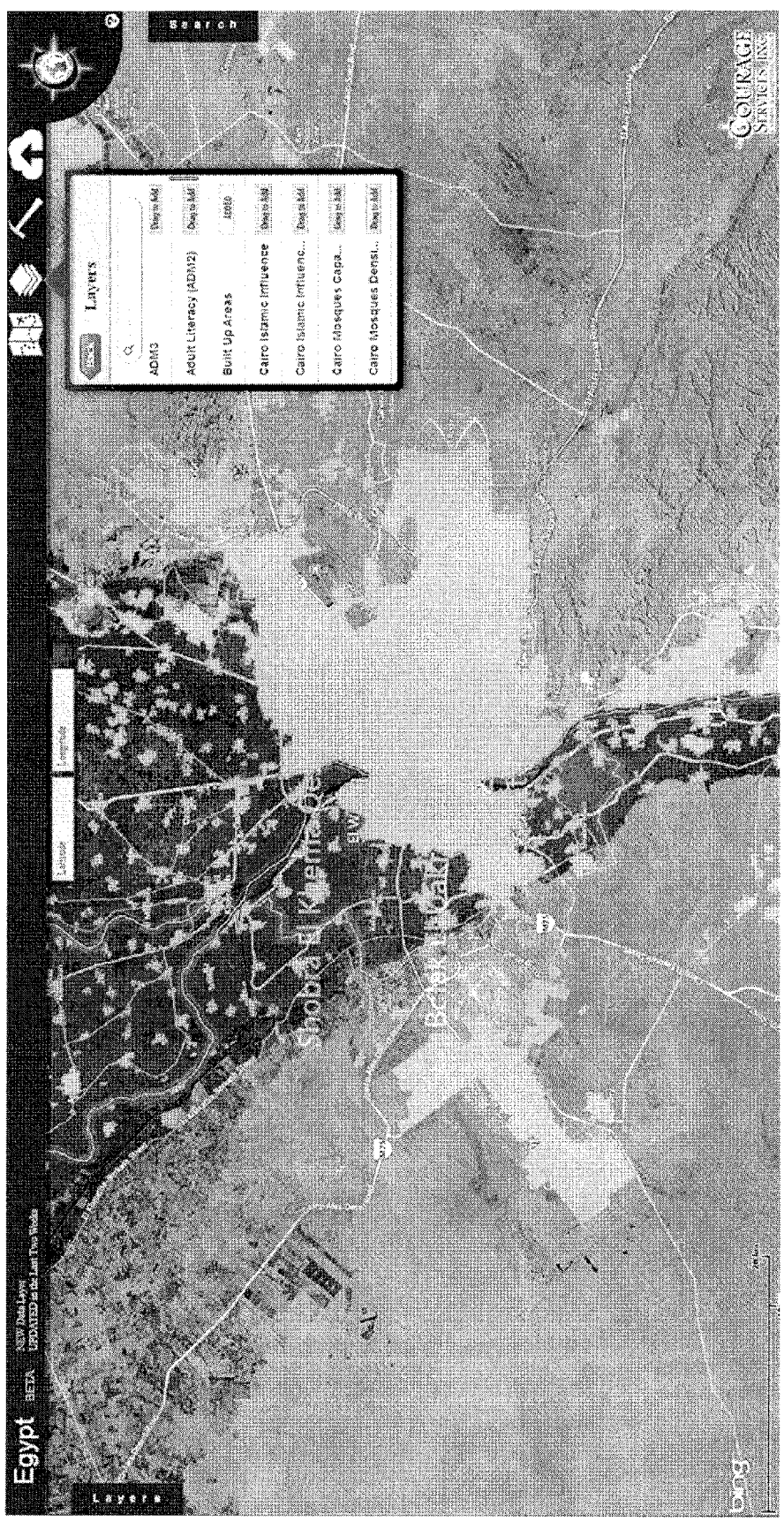
Figure 6:
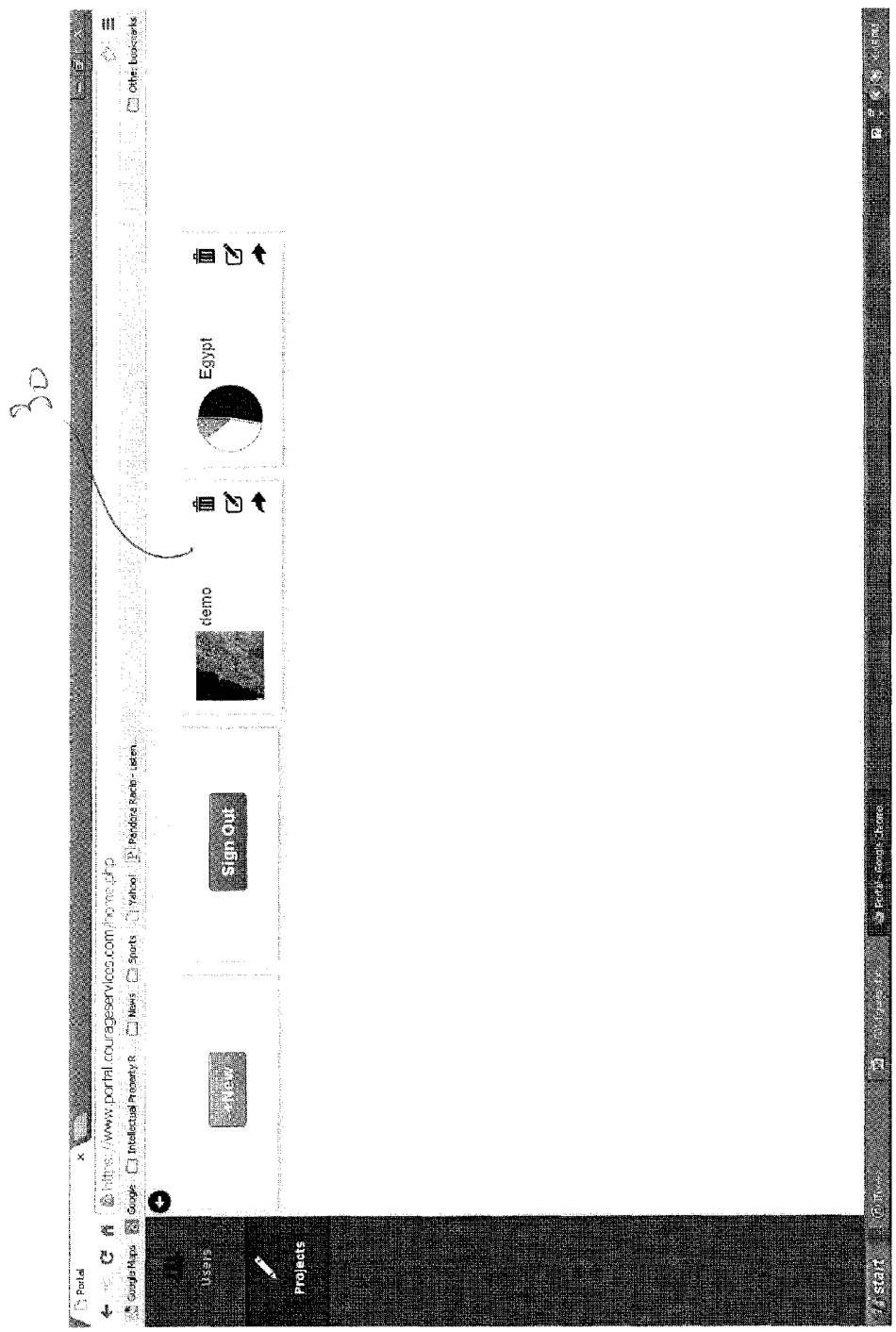

In a typical use case, and with reference to FIG. 2, a user logs into the present system 10 via a password restricted web-based interface 24 which can be built in AdobeFlex (migrating to HTML5) which is found on the Internet at https://geospatial.courageservices.com. Once logged into the present system 10, the user has the ability to drag and drop data from multiple data repositories to begin building a map of a particular place of interest (country, province, city, etc.). [C1]These layers include foundation layers like infrastructure and place names from the database of human geography data 12, the network of information concerning disaster relief and humanitarian assistance 16 and the database of research, software code and academic publications 18 to identify information via a static application programming interface (API). Attention is directed to FIGS. 3, 4 and 5 where the mapping tools are shown. As is appreciated these mapping tools allow for the addition of known information relating to the maps of interest. For example, it might be desirable to add information relating to "Built up areas" or Mosque density to the map of specific area of interest. Once such information is determined to be a desirable addition to the map, the user need only drag and drop the icon to incorporate such information into the map being considered.

A user researching recent activity in Egypt might identify a base map of Egypt for display upon the graphical user interface 22 of the present system 10. In conjunction with this base map, the user may incorporate additional layers of information relating to road locations, mass transit lines, water ways, hotels, airports and hospitals. All of this information will then be simultaneously viewable using the graphical user interface 22. As those skilled in the art will appreciate this relates to static information, that is, well established information that is not likely to be changing in the near future.

Additionally, through dynamic APIs, a user is also able to add near real-time data by extracting and visualizing social media from a variety of sources (Twitter, YouTube, Instagram, etc.) obtained from the social media data engine 14. As those skilled in the art will appreciate, the data available from such dynamic sources of information provides much more than textual, photographic and/or video data. Rather, the dynamic data from these sources provides geographic information, time information, as well as infrastructure and action of interest. This process allows analysts to correlate temporal and spatial patterns associated with action of interest in real time. This dynamic data is then integrated with the static data previously discussed.

For example, and with reference back to the use of the graphical user interface 22 to study recent events in Egypt, the dynamic information is integrated in a geographical accurate manner within the base map, and in relation to noted road locations, mass transit lines, water ways, hotels, airports and hospitals. It is appreciated that such dynamic information might be designated by flags 26 positioned at various locations around the base map to designate the geographic location from which the dynamic information is originating.

Once a user has built their unique analytic environment integrating static information with dynamic information, additional tools can be deployed to query, parse and add information as required. For example, and once again considering the example of studying events in Egypt, the user might wish to only visualize upon the graphical user interface 22 dynamic information relating to injuries or deaths. In such a situation, the underlying algorithms of the present system 10 are set to filter out all dynamic information other than that relating to injuries or deaths. Still further, the information relating to injuries or deaths might be displayed upon the graphical user interface 22 with designations relating to the timing and/or the course of events over a particular period of time.

With this in mind, it is appreciated, the unique set of tools employs algorithms and a federated search capability to provide additional background and context to the geospatial data.

For example, and in accordance with another example, a user can monitor an Influenza outbreak via chatter on social media and dynamically calculate the distance of individuals infected and their proximity to nearby hospitals and clinics. The user is then able to identify which hospitals and clinics may be overrun with patients and potentially exhaust supplies of medication. Such harvested information enables the user to timely supply the hospital or clinic with needed treatments and medicines to combat the outbreak. The present system also introduces components that allow the user to establish thresholds for activity (crowds forming, police activity, etc.) and receive notifications via a web-interface, or on mobile devices.

By way of example, and with reference to FIGS. 2 to 21, an exemplary use of the present system 10 is disclosed. It should, however, be appreciated that the system may be implemented in various manners and for various purposes. As such, the underlying displays and filtering criteria may be altered to suit a user's specific needs.

Considering the previous discussion, and once the user is logged onto the present system 10, the user is provided with the option of selecting from various projects. As discussed above, the user may be interested in studying current events occurring within a particular geographic area, for this example, Egypt. If such is the case, the user may click upon the Egypt project 30 (see FIG. 6). Once the Egypt project 30 is activated, the user is provided with the option of either viewing a dashboard of relevant information 32 or viewing a map of the events 34 with both static information and dynamic information superimposed thereupon.

Figure 7:
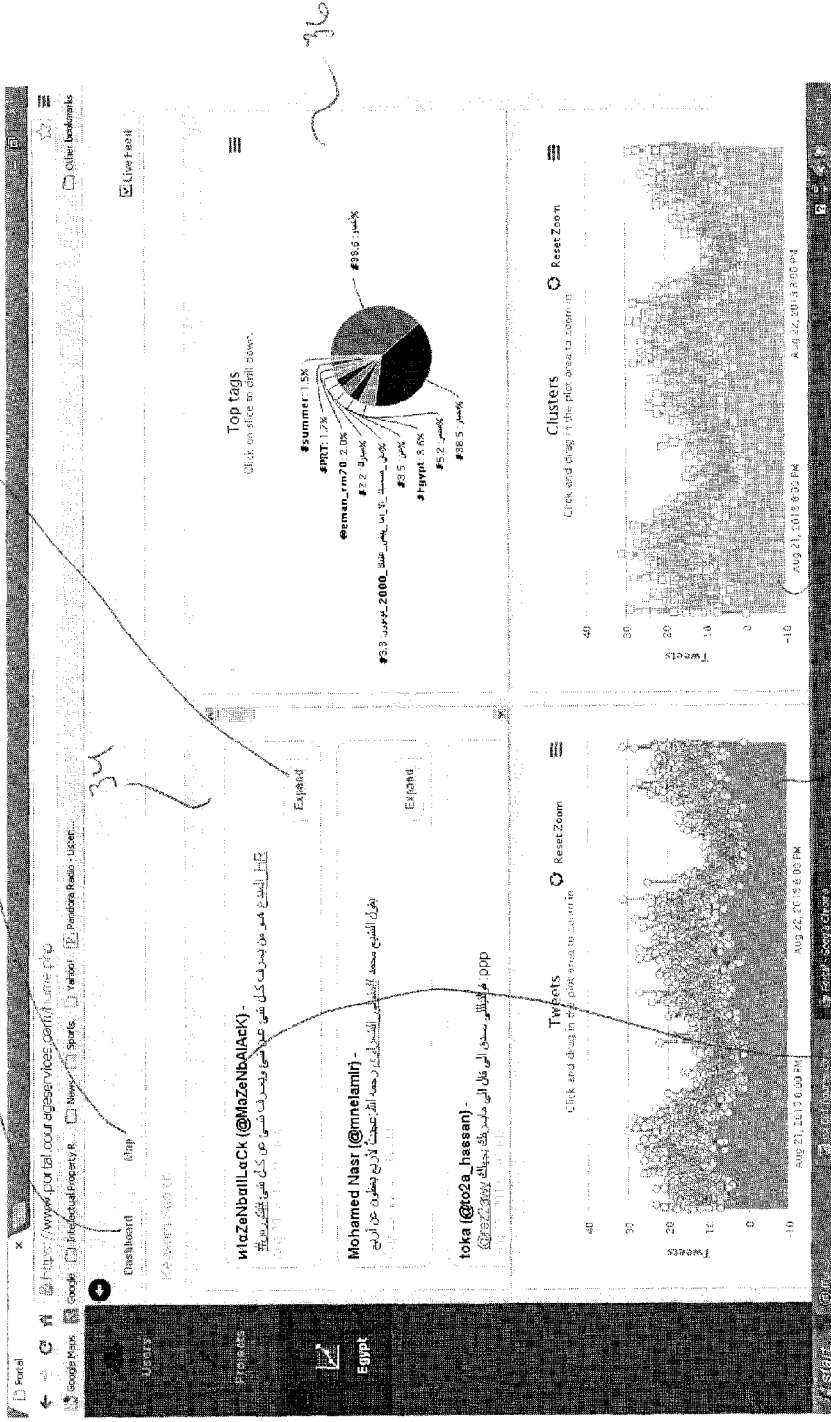
Figure 6:
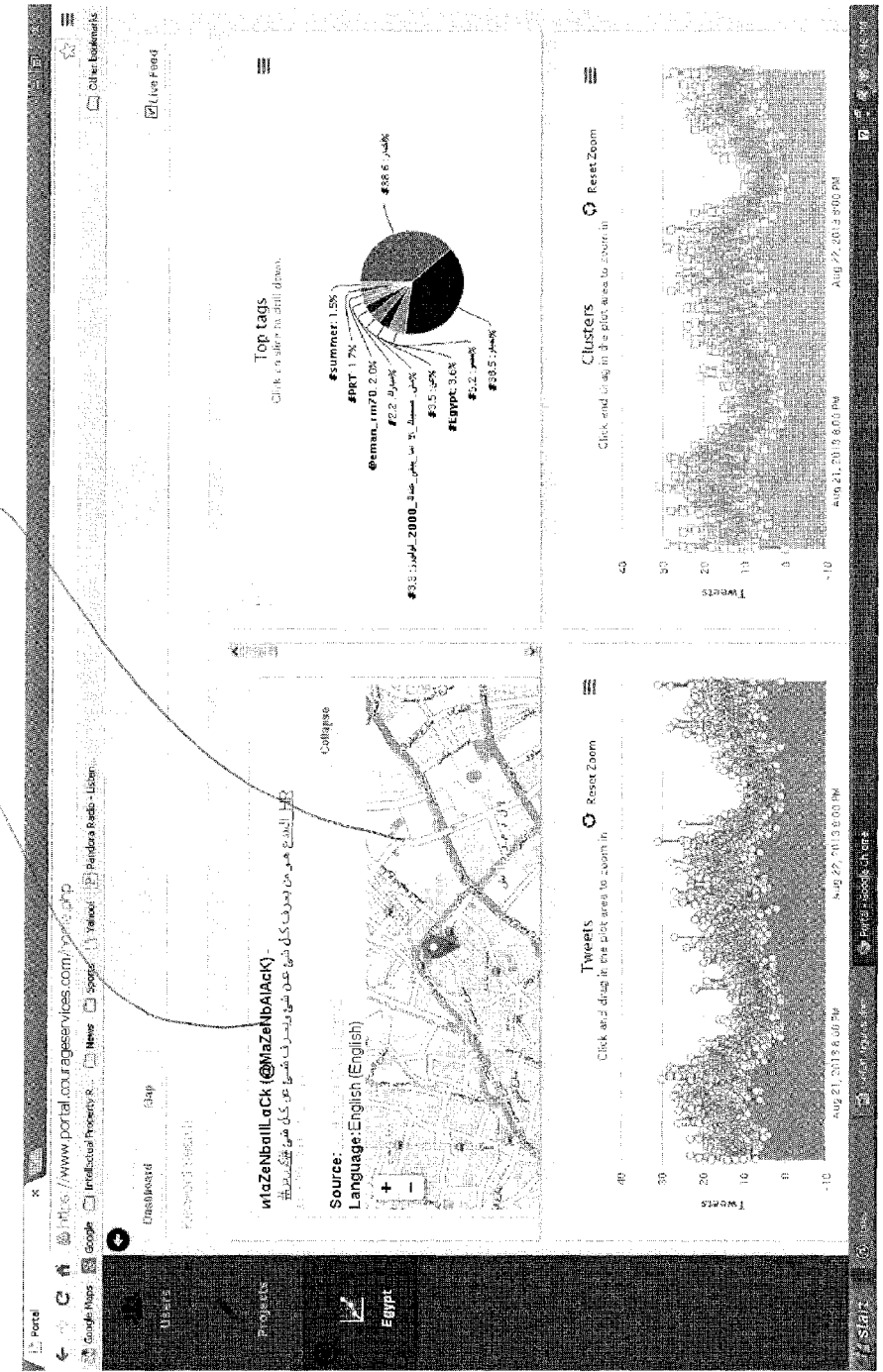
Figure 10:
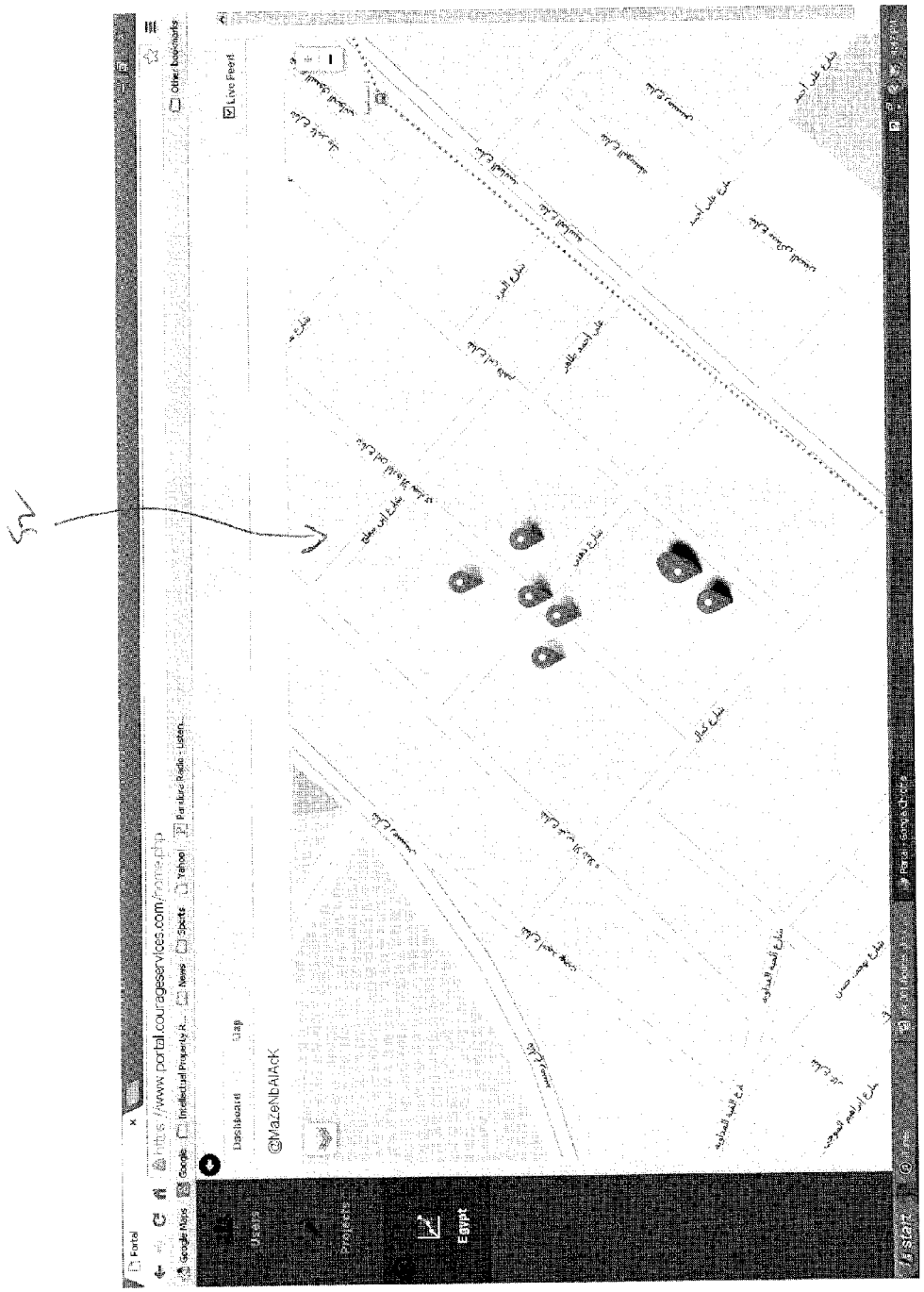
Figure 11:
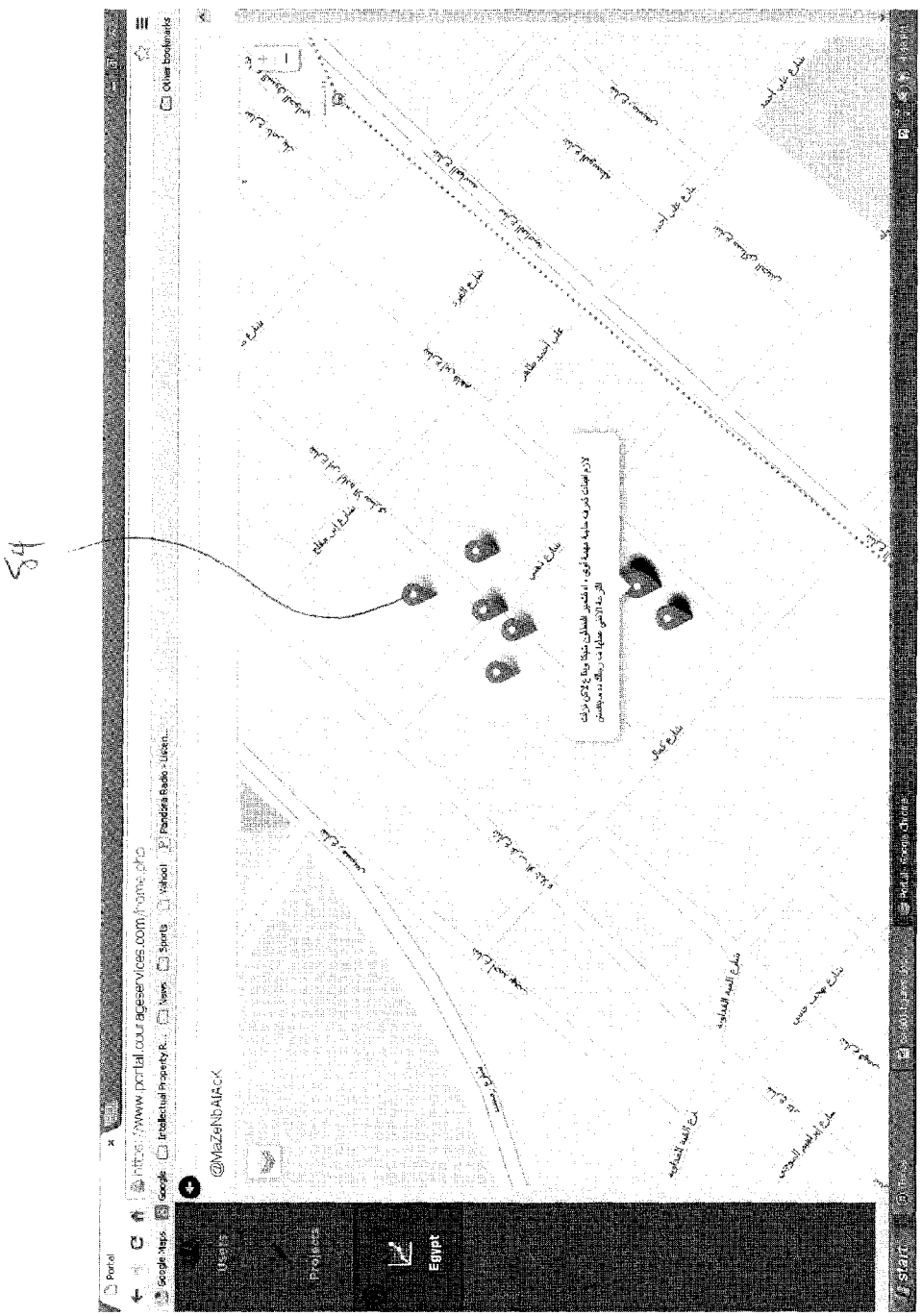
Figure 12:

Considering first the dashboard display provided by the graphical user interface 22, as shown with reference to FIG. 7, the user may select amongst four different panels 34, 36, 38, 40 presenting information in different manners. In the upper left corner panel 34, a sequential listing of Tweets identified from the geographic region of interest, that is, Egypt, is provided. If the user identifies a Tweet of interest, he or she may expand 42 the display to reveal the specific geographic location at which the Tweet originated 43 (see FIG. 8). If the user wishes to obtain more information regarding the individual who made the Tweet, the user may click upon the user's name 44 and find detailed information regarding the individual based upon information available from the social media source, in the present case, Twitter (see FIG. 9). This information includes associates of the tweeter 46 and a specific timeline of Tweets 48 made by the individual. Still further, the user may wish to track the movements of the Twitter account holder, in which case the user simply clicks upon "track movements" 50 and a map of the various locations at which the user made different Tweets is shown 52 (see FIG. 10). Further investigation may occur through clicking upon the various flags 54 to identify the specific Tweet made at a specific location (see FIG. 11). Still further, the map may be altered to show, via graphical representations, the number of Tweets made at specific locations 56 (see FIG. 12).

Figure 13:
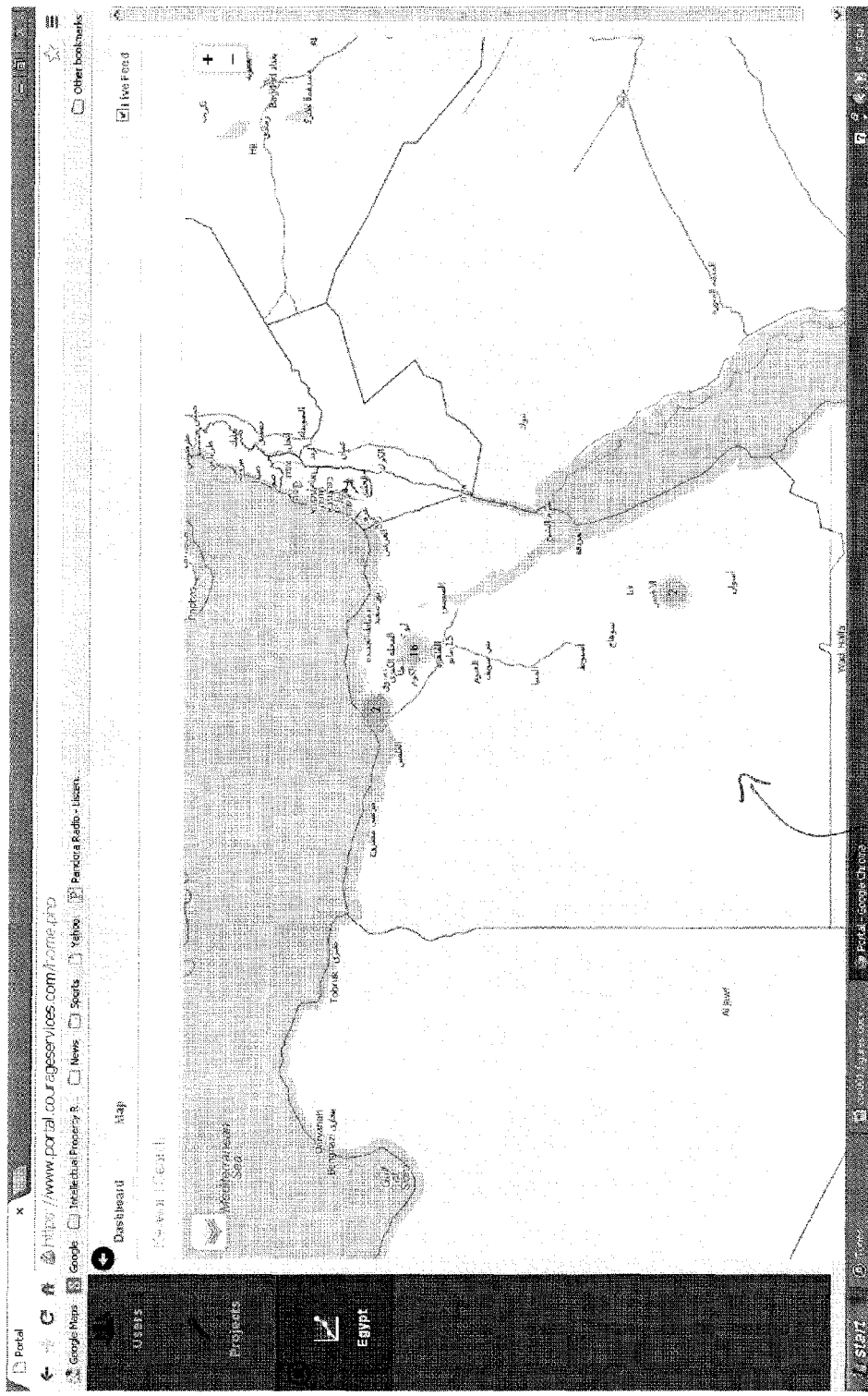
Figure 14:
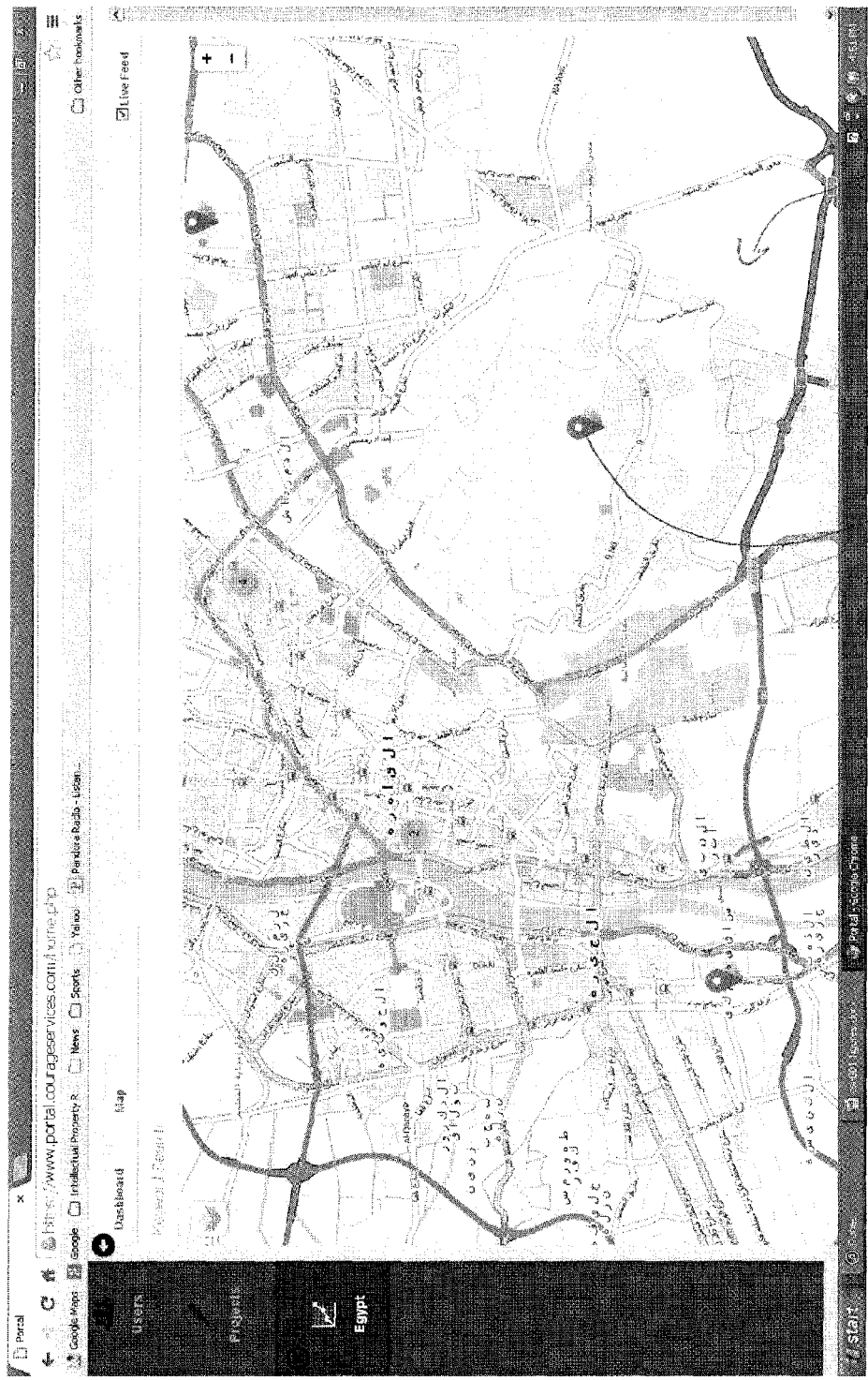
Figure 15:
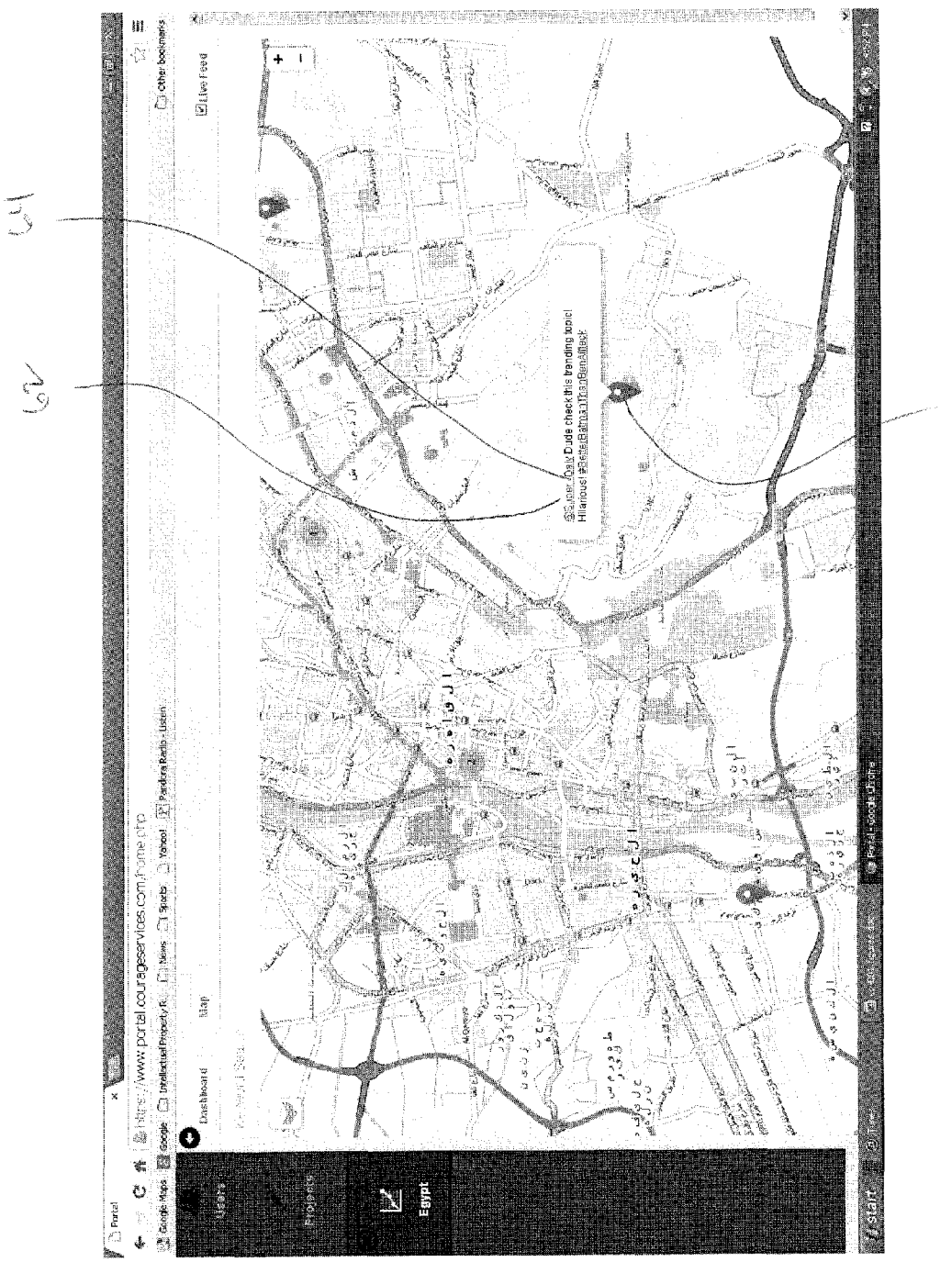
Figure 16:
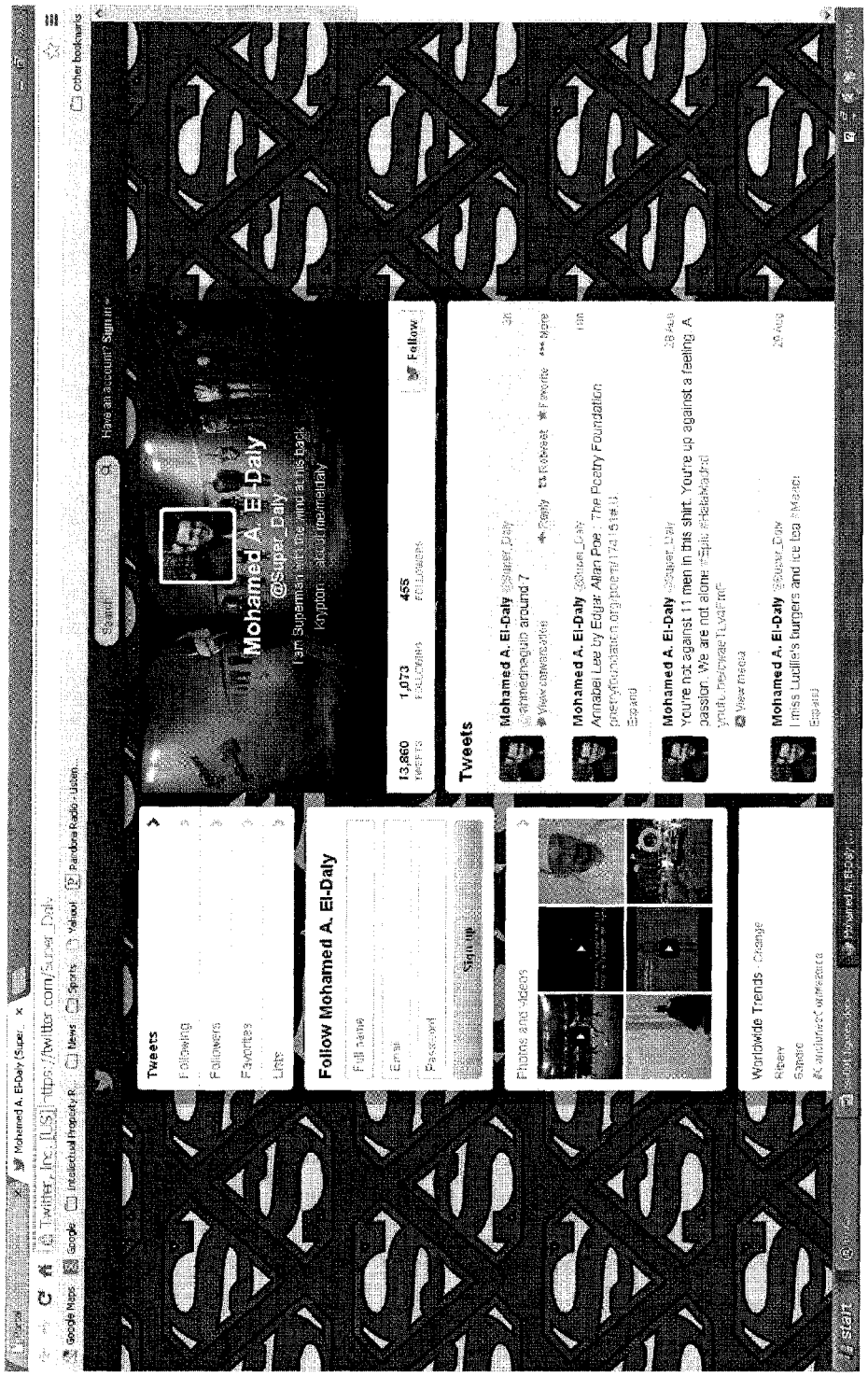

In the event the user wishes to identify information via the map function, this function is simply clicked upon and a map 58 of the geographic location of interest is shown, as depicted in FIGS. 13 & 14. As is well appreciated by those skilled in the art, the map 58 may be "zoomed in" upon to reveal specific locations and Tweets occurring at those locations. For example, and with reference to FIG. 15, a Tweet by @super_daily 62 was made at the specific location noted within Cairo, Egypt. If further information regarding the tweeter is desired, one may simply click upon the name 64 and immediately move to the individual's Twitter page 66 (see FIG. 16).

Figure 17:
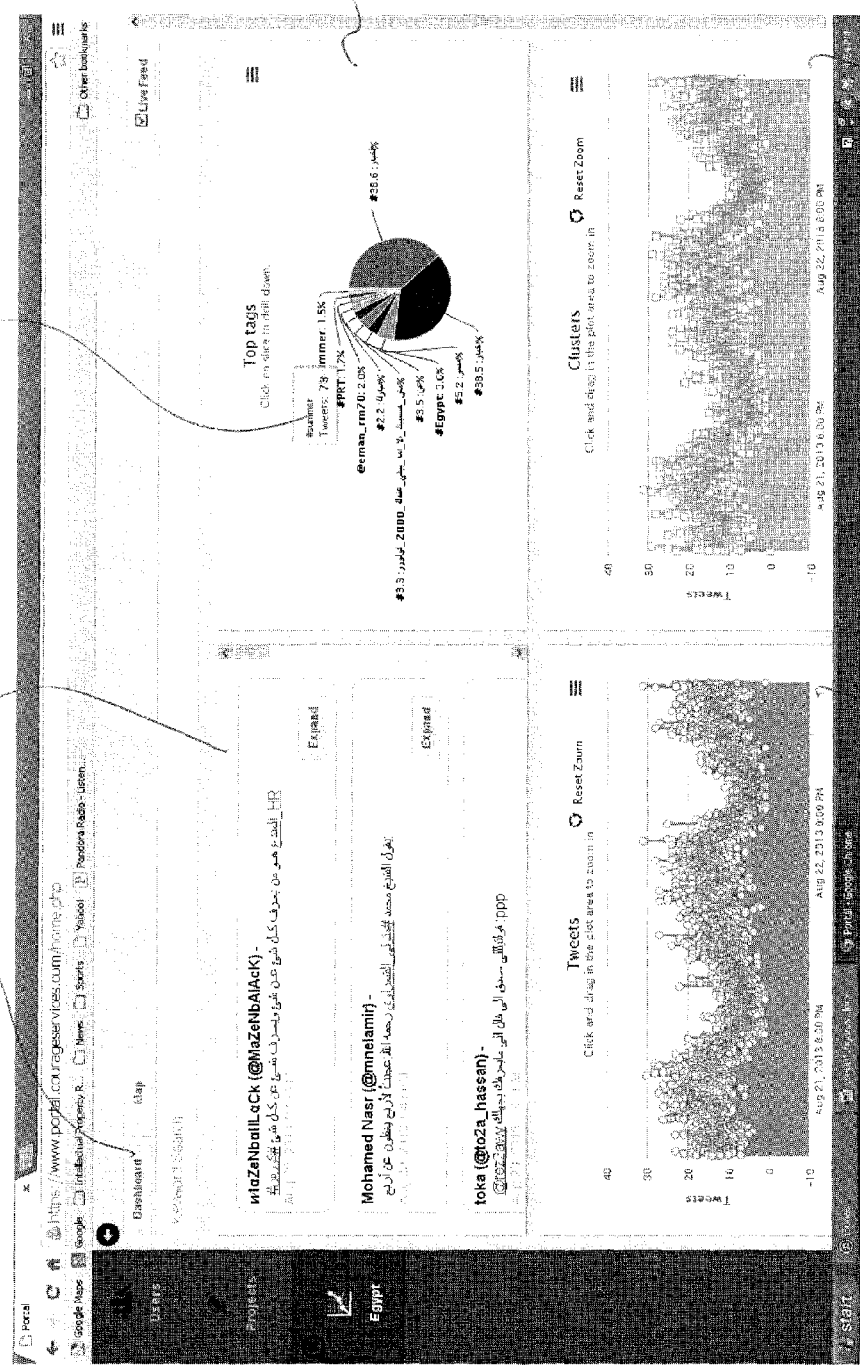
Figure 18:
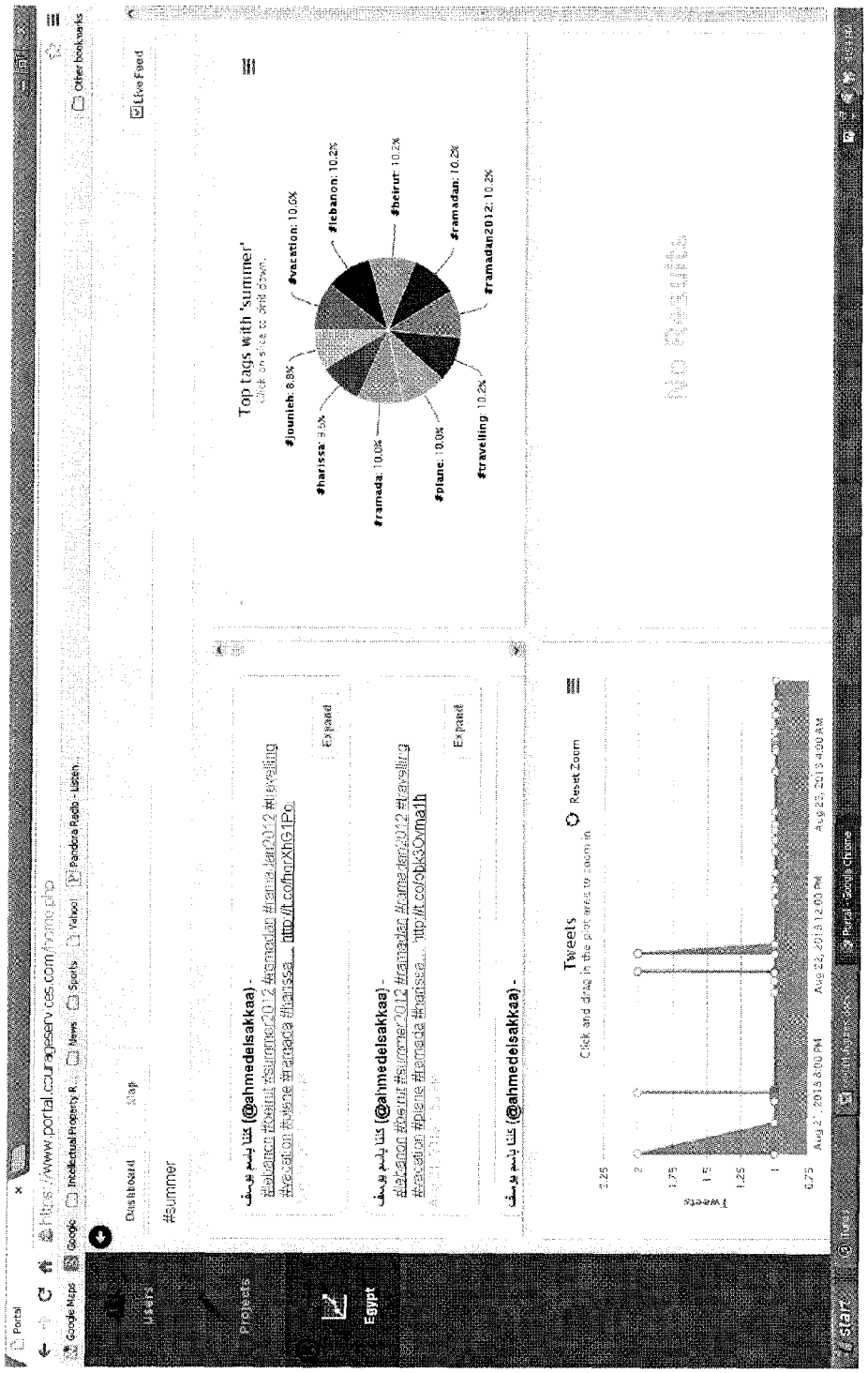

Referring now to FIG. 17 and returning to the dashboard 32, and as discussed above, the dashboard 32 includes various panels 34, 36, 38, 40 providing different displays relating to the information gathered in accordance with the present system 10. One display panel 36, that is, the display in the top right corner, identifies top tags utilized within the geographic region of interest. For example, and if a user wished to identify all individuals using the tag "summer" 66, the user may click upon this tag to reveal an additional dashboard focused upon tweeters utilizing the tag "summer" with further breakdowns relating to this usage (see FIG. 18).

Figure 19:
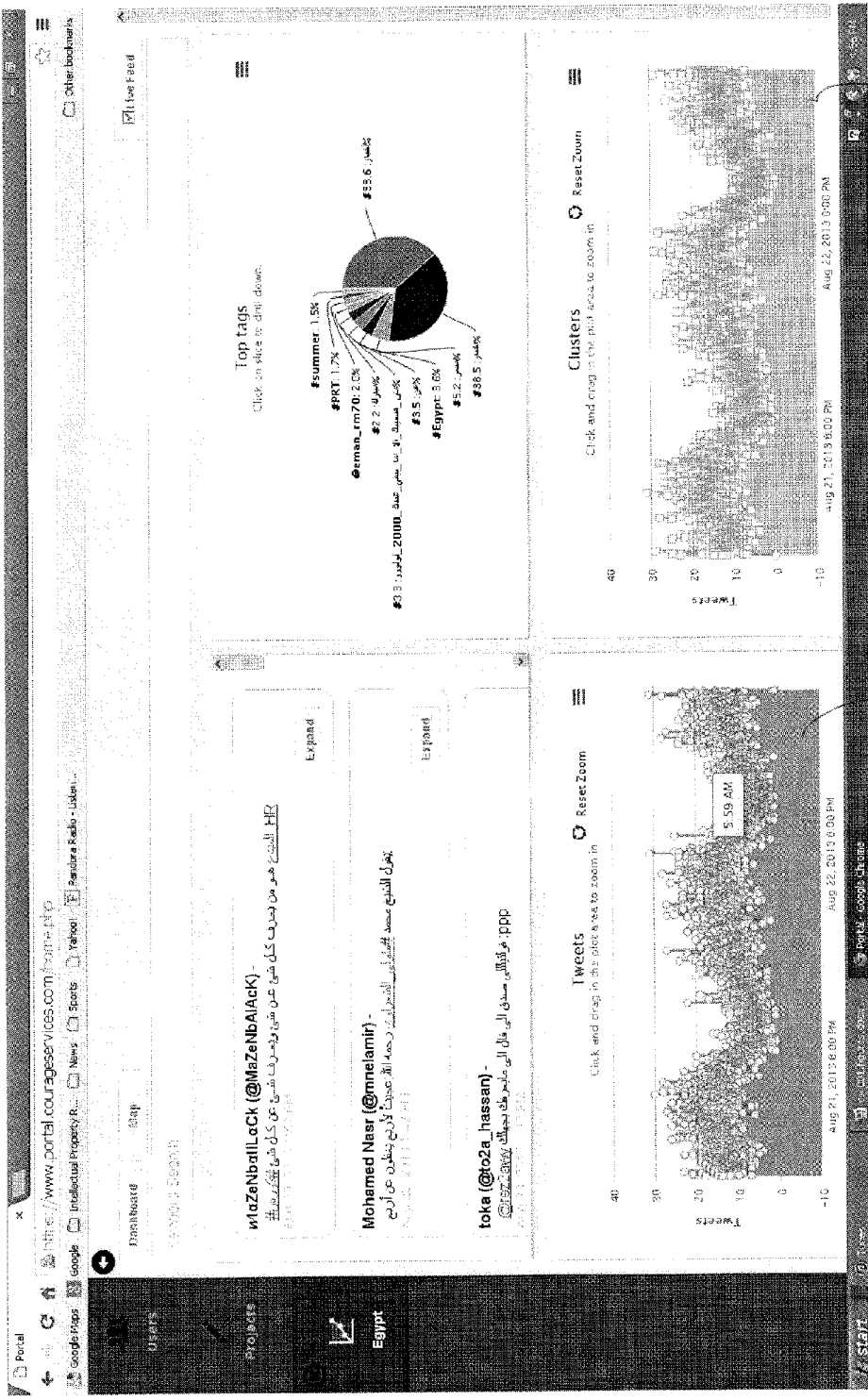
Figure 20:
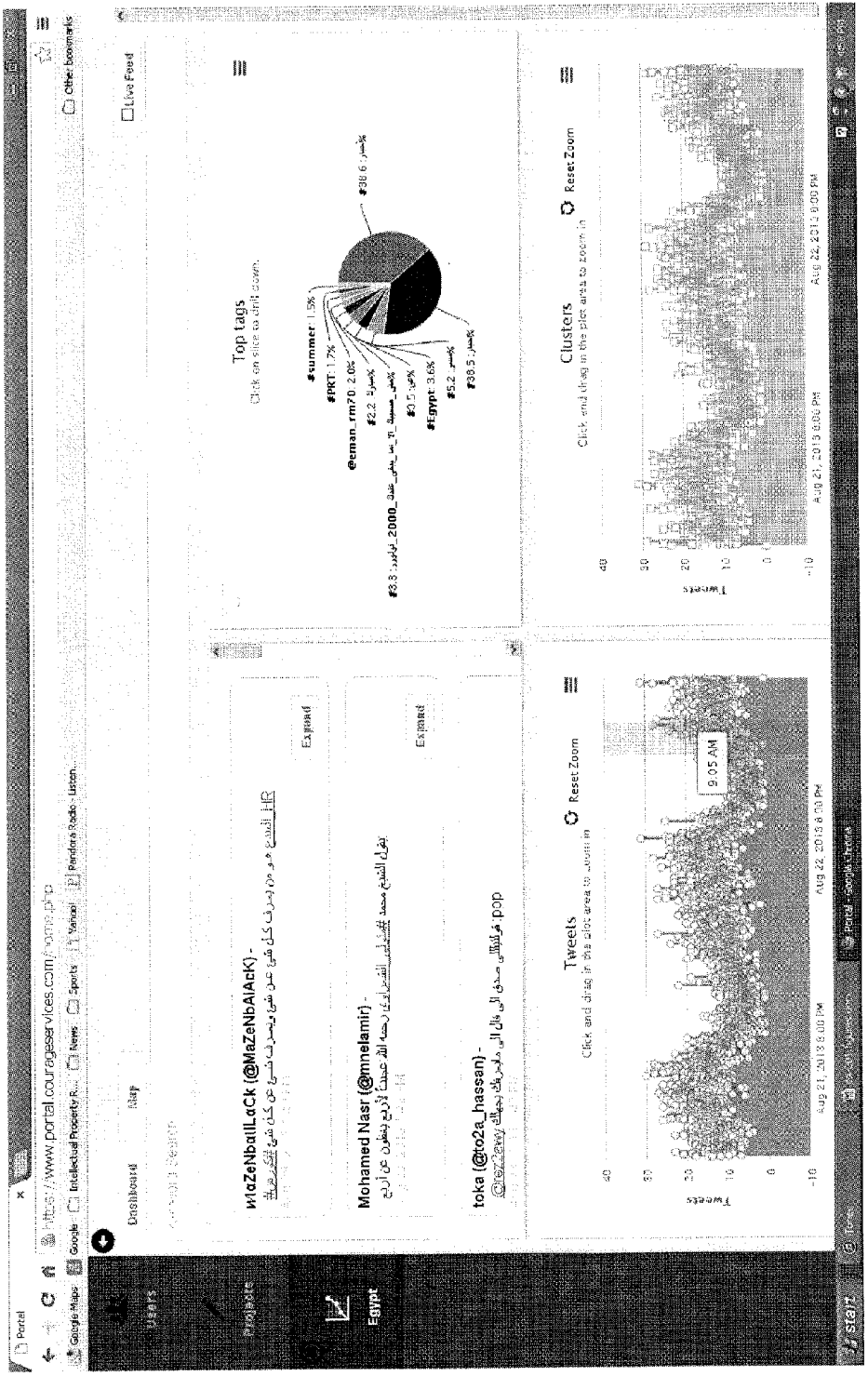
Figure 21:
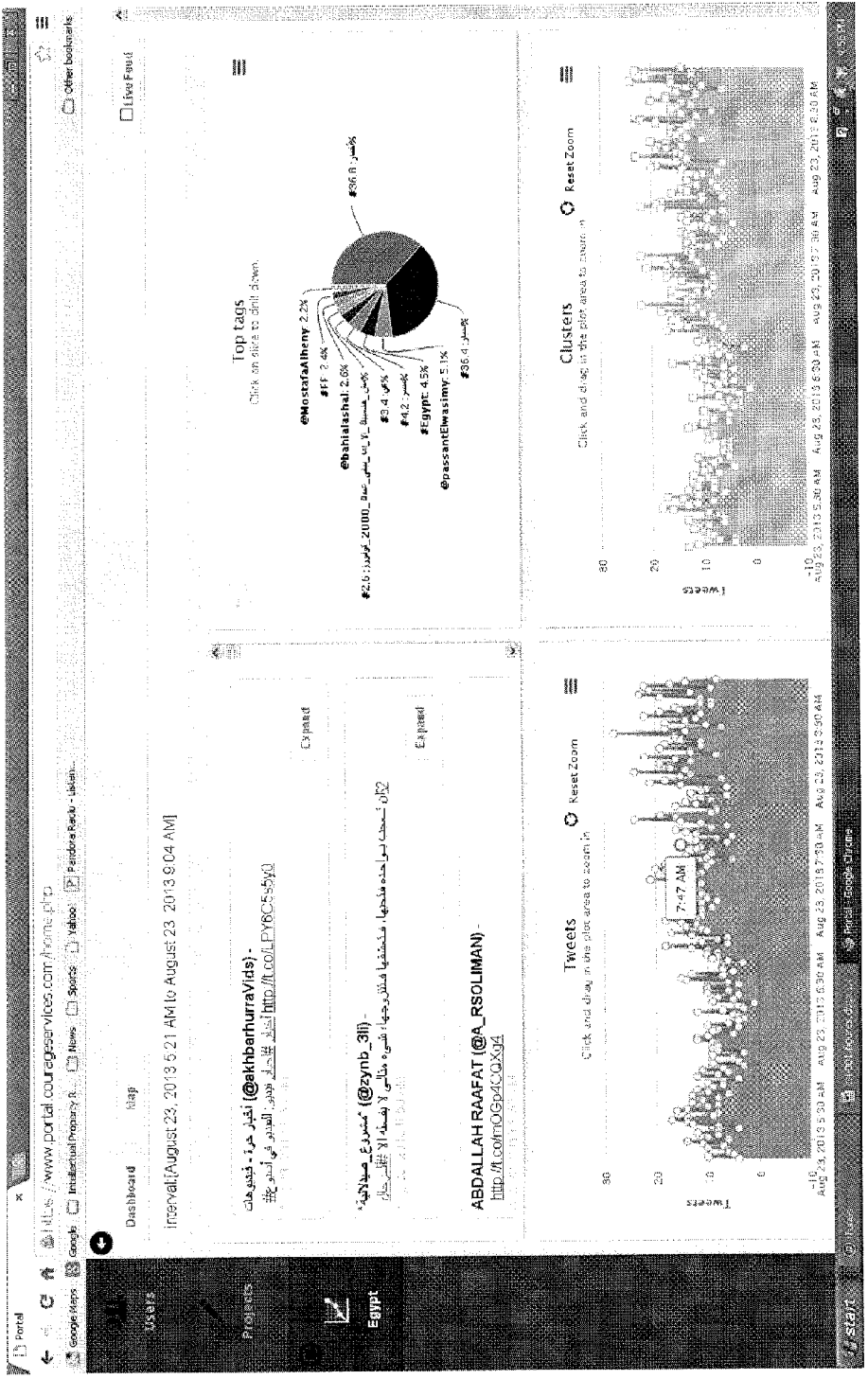

In addition, and with reference to FIG. 19, the dashboard 32 provides graphical representations regarding the number of Tweets made along a specific timeline (see panel 38) and the cluster of Tweets made along a specific timeline (see panel 40). As shown with reference to FIGS. 20 and 21, these graphical representations may be focused upon by simply highlighting specific timeframes therein.

With the foregoing in mind, the present invention provides wide ranging capabilities to suit a variety of specific needs. In summary, the present system provides for the dynamic display and download of geospatial data, with support for .KML/.KMZ and .SHP files. The present system further allows for "Drag and Drop" addition of geospatial data using the graphical user interface, support for real-time and near real-time data feeds, and social media data feeds and analysis tools. Dynamic data upload capability is further facilitated by the present system. The dynamic data upload includes fixed and mobile data input and support for geo-rectified .XLS, .KML/.KMZ and .SHP files. The system also provides for socio-cultural and human geography document and text search capability with multiple basemap and imagery base layer options using supports adding customized base layers. The system also offers "Single-Click" map export capability supporting production and dissemination. The system is further deployable upon a wide variety of computer systems, including, but not limited to, desktop system, laptops, tablets, and smartphones.

Given the wide ranging capabilities of the present system it is well suited for application in the Intelligence and Defense industry for situational awareness, integrated tactical support to the warfighter, social unrest and instability warning, diplomatic security and cyber activity monitoring. It is also appreciated the present system may be put to good use in conjunction with medical assistance and disaster relief, in particular, in conjunction with biological outbreak warning and tracking, infrastructure assessment and monitoring and population risk assessment. The present system also finds use in domestic application/law enforcement in conjunction with situational awareness, reporting and event notification and cross precinct data sharing. Still further, the present system is contemplated for use in various other commercial applications, including but not limited to, biological outbreak warning and tracking, retail trend analysis/product placement, financial transaction visualization, logistics and transport planning and routing and risk management.

While the preferred embodiments have been shown and described, it will be understood that there is no intent to limit the invention by such disclosure, but rather, is intended to cover all modifications and alternate constructions falling within the spirit and scope of the invention.

What is claimed is:

1. A real-time system for analysis and geospatial visualization, comprising:
   a NoSQL database of static and dynamic data composed of:
      human geography data composed of historical and current data on a plurality of countries that that has been acquired, collected, catalogued and geo-enabled;
      social media data compiled from international and local social media engines allowing for real-time situational awareness of geospatial and contextual trends anywhere;
      disaster relief and humanitarian assistance data; and
      research, software code and academic publication data collated to identify relationships between individuals, research and organizations, emerging technical and academic innovation leaders, and unpublished perspectives;
   an analysis engine focusing upon spatial patterns, content driven patterns and linguistic patterns using data generated from the NoSQL database of static and dynamic data to identify information, the generated data containing geographic and temporal attributes,
   the analysis engine includes spatio-temporal cluster detection algorithm that ingests real-time space-time points (events), plots ingested space-time points in four dimensions to establish an observed space-time study area, conducts Monte Carlo simulations which creates theoretical random experiments used to test significance of observed space-time patterns for detecting and identifying statistically significant spatio-temporal clusters so as to; and
   a graphical user interface displaying the generated data comprising dynamic information composed of geographic information, time information and infrastructure information identified by the analysis engine along with static information, the graphical user interface providing a mapping centric focus applying the dynamic and static information identified by the analysis engine within the context of a geospatial environment.

2. The system according to claim 1, wherein the human geography data includes human geography data on countries of the world including colonial archives, NGO reports, related academic publications, web-based sources and other sources of geo-spatial data.

3. The system according to claim 1, wherein the data includes data gathered from streaming APis.

4. The system according to claim 1, wherein the data includes data gathered from static APis.

5. The system according to claim 1, wherein the information concerning disaster relief and humanitarian assistance data is accessed from a passive access and information platform sharing information collected with organizations involved in disaster relief and humanitarian aid.

6. The system according to claim 1, wherein the analysis engine includes a plurality of tools allowing users to optimize the system.

7. The system according to claim 5, wherein the tools allowing users to optimize the system are selected from the group consisting of a federated text search, a natural language processor, a geo-cluster detection algorithm, a wealth detection algorithm, a dominance estimation algorithm, an emerging trend detection algorithm, a partner analysis module and combinations thereof.

8. The system according to claim 1, wherein the analysis engine uses a greedy deletion algorithm to calculate a minimum spanning tree for n to 1 experimental values in each simulation in order to establish experimental confidence intervals used to test observed values.

9. The system according to claim 8, wherein when the experimental confidence intervals are established, observed space-time point patterns are tested at each n value from n to 1 in order to test all potential cluster sizes within a temporal cross-section.

* * * * *